United States Patent [19]

Mydels

[11] 3,981,367
[45] Sept. 21, 1976

[54] SPRING TRIP CULTIVATOR SHANK ASSEMBLY

[75] Inventor: John W. Mydels, La Porte, Ind.

[73] Assignee: Allis-Chalmers Corporation, Milwaukee, Wis.

[22] Filed: Sept. 29, 1975

[21] Appl. No.: 617,935

[52] U.S. Cl. ............................. 172/265; 172/719
[51] Int. Cl.² ......................................... A01B 61/04
[58] Field of Search .......... 172/265, 266, 267, 268, 172/719, 707, 708

[56] References Cited
UNITED STATES PATENTS

| 186,803 | 1/1877 | Conaway | 172/719 |
| 264,319 | 9/1882 | Mendenhall | 172/267 |
| 301,545 | 7/1884 | Wheeler | 172/265 |
| 530,819 | 12/1894 | Baker | 172/267 |
| 2,906,353 | 9/1959 | Rogers | 172/265 |
| 3,084,749 | 4/1963 | Anderson | 172/268 |
| 3,098,529 | 7/1963 | Wade et al. | 172/265 |
| 3,173,494 | 3/1965 | Padwick | 172/265 |
| 3,700,039 | 10/1972 | Essex | 172/265 |

Primary Examiner—George J. Marlo
Attorney, Agent, or Firm—Robert C. Sullivan

[57] ABSTRACT

A self-restoring spring trip cultivator shank assembly adapted to be supported from a mounting bracket secured to the transverse tool bar of a ground-working agricultural implement. The lower end of the cultivator shank carries a ground-working tool and the forward end extends between a pair of laterally spaced side plates which are supported by the mounting bracket contiguous the under surface of the tool bar, the forward end of the cultivator shank being adapted to pivot about the peripheral surface of a pivot pin which extends between and through the laterally spaced side plates. An abutment member in the form of leaf spring which extends in overlying contacting engagement to the upper surface of the cultivator shank is suitably held against the forward end portion of the cultivator shank to maintain the cultivator shank in pivotal bearing relation against the peripheral surface of the pivot pin. A loading spring subassembly supported from the mounting bracket is adapted to engage the rearward end of the leaf spring whereby to transmit the spring loading force to the leaf spring and thus to the cultivator shank which is in underlying contacting relation to the leaf spring. When the tool carried by the lower end of the cultivator shank engages an obstacle such as a rock, the cultivator shank will pivot upwardly and forwardly about the pivot pin carried by the side plates, this movement of the cultivator shank causing compression of the loading or compression spring. When the earth-working tool has passed the obstacle, the loading spring will return the cultivator shank to a position in which the tool carried by the shank is again in proper earth-working position.

12 Claims, 2 Drawing Figures

U.S. Patent  Sept. 21, 1976  3,981,367
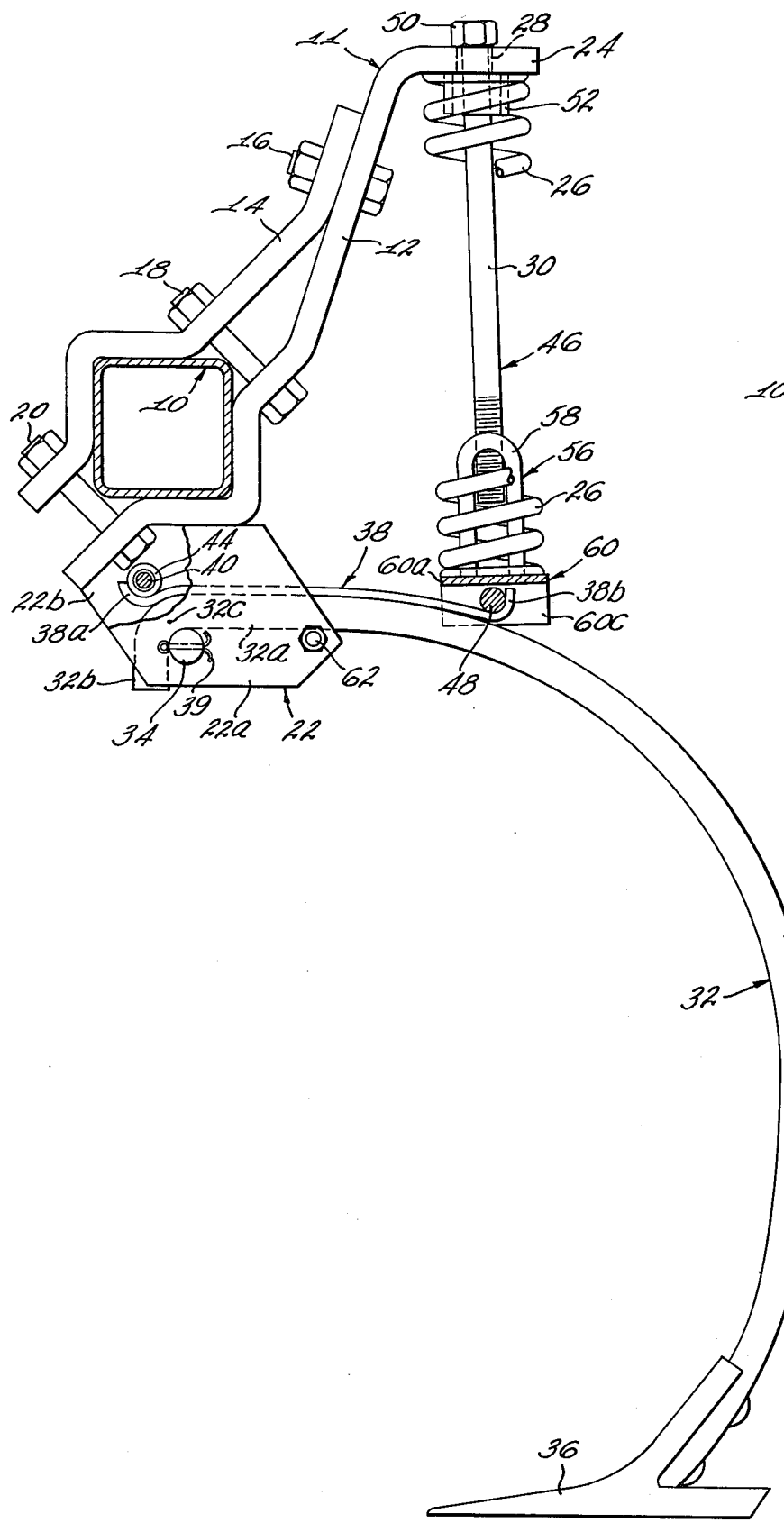
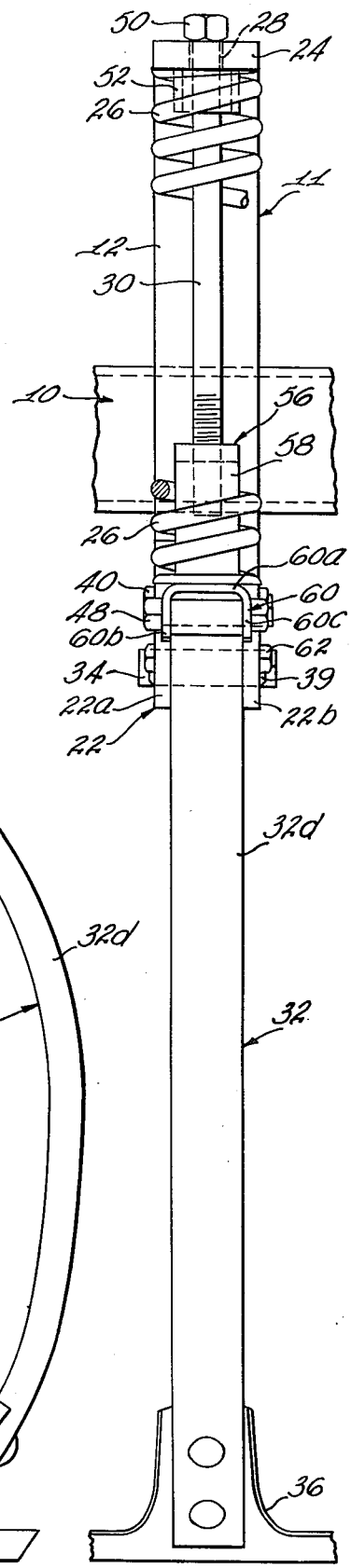
Fig. 1
Fig. 2

3,981,367

SPRING TRIP CULTIVATOR SHANK ASSEMBLY

BACKGROUND OF THE INVENTION

1. Field of the Invention

This invention relates to earth-working agricultural implements, and more particularly, to a self-restoring spring trip cultivator shank assembly such as that used on field cultivators and chisel plows, and more especially, to such a spring trip cultivator shank assembly in which the cultivator shank does not require structural alterations to receive the loading spring which acts on the shank.

2. Description of the Prior Art

In many ground-working agricultural implements, it is desirable to have the tool-supporting cultivator shank spring loaded so that the ground-working tool carried thereby can deflect upwardly over an immovable obstruction, such as a rock, rather than be damaged by the obstruction; and, once the obstruction has been cleared, it is desirable to have the cultivator shank restore itself to its original position without stopping movement of the implement on which the cultivator shank is mounted. Spring loaded cultivator shanks of the general character just described are shown, for example, by U.S. Pat. Nos. 3,089,529 issued to R. E. Wade et al. on July 23, 1963; 3,700,038 issued to Duane A. Essex on Oct. 24, 1972, and 3,700,039 issued to Duane A. Essex et al. on Oct. 24, 1972.

Any method of transmitting the spring loading to the pivotally movable cultivator shank which involves a machining operation or the like on the shank to accept the connection of the loading spring to the shank tends to weaken the shank at the location of such machining operations and to create a region of stress concentration at such location.

OBJECTS OF THE INVENTION

Accordingly, it is an object of the present invention to provide a self-restoring spring trip shank assembly for use on field cultivators and the like in which the spring loaded cultivator shank does not require any structural modifications to accept the biasing force of the loading spring.

It is another object of the invention to provide a self-restoring spring trip shank assembly for use with a field cultivator or the like in which the cultivator shank does not require any potentially weakening structural alterations to accept the biasing force of the loading spring which acts on the cultivator shank.

SUMMARY OF THE INVENTION

In achievement of these objectives, there is provided in accordance with an embodiment of the invention a self-restoring spring trip cultivator shank assembly adapted to be supported from a mounting bracket secured to the transverse tool bar of a ground-working agricultural implement. The lower rearwardly disposed end of the cultivator shank carries a ground-working tool. The forward end of the cultivator shank extends between a pair of laterally spaced "side plates" which are supported by the mounting bracket contiguous the under surface of the tool bar, the forward end of the cultivator shank being adapted to pivot about the peripheral surface of a pivot pin which extends between and through the laterally spaced clamp plates. A leaf spring which extends in overlying contacting engagement to the upper surface of the cultivator shank is suitably held against the forward end portion of the cultivator shank to maintain the cultivator shank in pivotal bearing relation against the peripheral surface of the pivot pin. A loading spring subassembly supported from the mounting bracket is adapted to engage the rearward end of the leaf spring whereby to transmit the spring loading force to the leaf spring and thus to cultivator shank which is in underlying contacting relation to the leaf spring. When the tool carried by the lower end of the cultivator shank engages an obstacle such as a rock, the cultivator shank will pivot upwardly and forwardly about the pivot pin carried by the side plates, this movement of the cultivator shank causing compression of the loading spring. When the earth-working tool has passed the obstacle, the loading spring will return the cultivator shank to a position in which the tool carried by the shank is again in proper earth-working position.

BRIEF DESCRIPTION OF THE DRAWING

Further objects and advantages of the invention will become apparent from the following description taken in conjunction with the accompanying drawing in which:

FIG. 1 is a side elevation view of a spring trip cultivator shank assembly in accordance with the invention; and FIG. 2 is an end elevation view of the spring trip cultivator shank assembly of FIG. 1.

BRIEF DESCRIPTION OF THE PREFERRED EMBODIMENT

Referring now to the drawing, there is shown a tool bar, generally indicated at 10, on which the spring trip cultivator shank assembly in accordance with the invention is mounted as will now be described. It will be understood, of course, that normally a plurality of cultivator shank assemblies such as that to be herein described, and shown in the drawing, are mounted in longitudinally spaced relation to each other on tool bar 10. A support subassembly 11 includes first and second bracket arms 12 and 14. The first bracket arm 12 is formed or contoured to embrace a portion of the right-hand (relative to FIG. 1) or rearwardly facing end wall of tool bar 10 and also to embrace a portion of the lower wall of tool bar 10. The second bracket arm 14 is formed or contoured to embrace a portion of the upper wall of tool bar 10 and a portion of the forward or left-hand (relative to FIG. 1) end wall of tool bar 10. The two bracket arms 12 and 14 are bolted together so as to securely engage each other and also tool bar 10 by means of the bolt and nut assemblies indicated at 16, 18 and 20.

A pair of vertically disposed side plates generally indicated at 22 and individually designated at 22a and 22b (FIG. 2) are mounted in laterally spaced relation to each other (but longitudinally of each other relative to tool bar 10), plates 22a and 22b being welded to bracket arm 12. The lateral spacing between the plates 22a and 22b is sufficient to permit pivotal movement in a vertical plane of the forward end of the cultivator shank as will be explained hereinafter.

The upper end of bracket arm 12 is bent in a substantially horizontal plane to provide a rearwardly projecting substantially horizontal bracket portion indicated at 24 which serves as a bearing for the upper end of a compression spring 26, and is also provided with a clearance passage 28 which accepts spring guide rod 30, as will be explained in more detail hereinafter.

The cultivator shank is generally indicated at 32 and includes a forward portion 32a which extends between the side plates 22a and 22b, a downwardly curved portion indicated at 32d, and a lower end portion to which is attached a ground working tool 36. Cultivator shank 32 terminates at the forward end thereof in a relatively short downwardly bent portion 32b which extends at substantially right angles to the portion 32a. The shank 32 is curved at the junction of portions 32a and 32b to form a pivot part 32c having an inner radius of curvature which is substantially the same as the radius of curvature of a horizontally extending pivot pin 34 which extends between and beyond side plates 22a. Pivot pin 34 serves as a fulcrum about which cultivator shank 32 may pivot upwardly in a vertical plane if the cultivator tool 36 carried by the lower end of the shank 32 should meet an obstacle such as rock, for example, during the earth-working operation. The pivot pin 34 traverses the lateral space between the two side plates 22a and 22b and extends through apertures in plates 22a, 22b for a short distance beyond the outer lateral surface of each of the plates 22a and 22b. Oppositely disposed cotter pins 39 extend through passages in oppositely projecting ends of pivot pin 34 to retain the pivot pin in proper location relative to plates 22a, 22b.

The downwardly projecting end portion 32b of cultivator shank 32 serves to prevent rearward movement of shank 32 relative to pivot pin 34 and also reacts against the inner vertical surfaces of the side plates 22a and 22b to stabilize the cultivator shank 32 in a lateral direction and to maintain the shank in proper working position relative to the support subassembly for the cultivator shank.

The curved part 32c of the cultivator shank 32 is maintained in pivotal bearing relation against the periphery of pivot pin 34 by the cooperative action of a leaf spring generally indicated at 38 and a transverse bolt 40 which extends laterally across the space between side plates 22a, 22b and through suitable aperatures in side plates 22a, 22b. Shank portion of bolt 40 has positioned thereabout a sleeve 44.

Leaf spring 38 is substantially the same width as the upper surface of shank 32. The forward portion of leaf spring 38 lies between side plates 22a and 22b in overlying relation to the upper surface of shank 32, with the forward end 38a of leaf spring 38 being curved upwardly about the sleeve 44 which surrounds the shank portion on bolt 40. The transverse bolt 40 and the curved end 38a of leaf spring 38 are located in the region where forward end portion 32b of cultivator shank 32 bends downwardly. Leaf spring 38 is in effect pivotally connected to the sleeve member 44 on the shank of bolt 40 in close proximity to the pivot part 32c of shank 32. The spacing between sleeve member 44 and the facing surface of shank 32 are so related to each other and to the thickness of leaf spring 38 that leaf spring 38 serves to hold the pivot part 32c of shank 32 in pivotal bearing relation against the periphery of pivot pin 34.

Leaf spring 38 extends beyond the rearward end of side plates 22a and 22b, continuing in overlying relation to the upper surface of cultivator shank 32, and terminating in an upwardly bent portion 38b which is pivotally engaged by the shank of a bolt 48 carried by the spring loading subassembly generally indicated at 46, as will be described in more detail hereinafter.

Spring-loading subassembly 46 comprises a spring guide rod 30 which extends through the clearance passage 28 of rearwardly extending horizontal portion 24 of bracket arm 12. The upper end of spring guide rod 30 is provided with a head portion 50 which is of larger size than the clearance passage 28 through which the rod passes, whereby head portion 50 on spring guide rod 30 serves to limit the downward motion of rod 30 relative to the horizontal portion of support bracket 12. As will be explained, when ground-working tool 36 encounters an obstacle such as a rock, spring guide rod 30 moves upwardly through clearance passage 28 in rearwardly extending bracket portion 24.

A cylindrical spring guide 52 is welded or otherwise suitably secured to the under surface of horizontal portion 24 of support bracket 12 to serve as a guide for the upper end of coil type compression spring 26, the cylindrical guide 52 being provided with an internal clearance passage therethrough which permits vertical movment of spring guide rod 30. The lower end of spring guide rod 30 is adjustably threadedly engaged with the upper end of a U-shaped spring guide portion 58 of a "pivot block" subassembly generally indicated 56. The lower ends of the opposite walls of the U-shaped spring guide member 58 are secured to or integral with a U-shaped member generally indicated at 60 which includes a generally horizontal upper wall 60a from which downwardly extend a pair of oppositely disposed side walls or legs 60b and 60c. The opposite legs 60b and 60c of the U-shaped member 60 straddle the lateral width of the leaf spring 38 and of the cultivator shank 32. The bolt 48 spans the space between the opposite lateral walls 60b and 60c of the member 60, extending through and being secured to these walls by means of a suitable nut member.

The compression spring 26 is positioned coaxially about spring guide rod 30, with the upper end of the spring 26 bearing on the under surface of the horizontal portion 24 of support bracket 12 and with the lower end of spring 26 bearing on the upper surface of wall 60a of the U-shaped member 60.

It can be seen from the construction just described that the downward biasing force of compression spring 26 is communicated through transverse bolt 48 carried by U-shaped member 60 to end portion 38b of leaf spring 38 which lies against the upper surface of cultivator shank 32, with the spring loading force being transferred to the upper surface of cultivator shank 32 through leaf spring 38, without the necessity of any potentially weakening structural modification of the cultivator shank to accept the biasing force of the loading spring.

SUMMARY OF OPERATION

During the normal operation of the spring loaded cultivator shank hereinbefore described, the cultivator shank 32 is maintained in substantially the position shown in FIG. 1 in which the loading force of spring 26 urges the cultivator shank 32 in a downward position whereby the tool 36 is urged into proper earth-working engagement. The transversely extending bolt 62 positioned contiguous the rearward end of the side plates 22 and which passes through both of the oppositely disposed plates 22a and 22b engages the under surface of cultivator shank 32 to serve as a downward stop to limit the downward movement of cultivator shank 32.

If during the earth-working procedure the cultivator tool 36 at the lower end of shank 32 encounters an obstacle such as a rock, cultivator shank 32 will pivot upwardly about pivot pin 34 due to the coaction between the curved inner surface of curved pivot part 32c contiguous the forward end of the cultivator shank 32 and the outer peripheral surface of the pivot pin 34 acting as a fulcrum. The forward end portion of cultivator shank 32 is held in proper pivotal relation with respect to pivot pin 34 by the cooperative action of the forward end portion of leaf spring 38 and of sleeve 44 carried by the shank of transverse bolt 40, as previously described.

When the cultivator shank moves upwardly and in a counterclockwise direction (relative to FIG. 1) about pivot pin 34, the spring loading subassembly 46 moves in an upward direction to accomodate the upward movement of the cultivator shank 32, causing the upper end portion of spring guide rod 30 to move upwardly through clearance passage 28 in horizontal portion 24 to support bracket 12, and causing spring 26 to be compressed.

When tool 36 at the lower end of cultivator shank 32 clears the rock or other obstruction, the downward biasing force of loading spring 26 will cause shank 32 to move downwardly to return tool 36 to the earth-working position shown in the drawing, transverse bolt 62 carried by side plates 22a, 22b serving as a stop to limit the downward movement of shank 32.

From the foregoing detailed description of the invention, it has been shown how the objects of the invention have been obtained in a preferred manner. However, modifications and equivalents of the disclosed concepts, such as readily occur to those skilled in the art, are intended to be included within the scope of this invention.

The embodiments of the invention in which an exclusive property or privilege is claimed are defined as follows:

1. A spring trip cultivator shank assembly adapted to be supported from a bracket structure carried by the transverse tool bar of a cultivator apparatus, comprising a pair of downwardly extending side plates positioned contiguous the forward end of said assembly, said side plates being spaced laterally from each other but longitudinally of said tool bar, a cultivator shank adapted to support a cultivator tool contiguous the lower end thereof, the upper forward end of said cultivator shank extending between said side plates and including a pivot part, horizontally extending pivot means carried by said side plates engaging said pivot part to accomodate pivotal movement of said cultivator shank in a vertical plane, an abutment member received between said side plates and bearing against said cultivator shank to hold said cultivator shank against said pivot means, said abutment member extending beyond and rearwardly of said side plates in overlying abutting relation to the upper surface of said cultivator shank, a loading spring subassembly supported from a rearwardly extending portion of said bracket structure, the lower end of said loading spring subassembly bearing against a rearward portion of said abutment member whereby to transmit through said abutment member a downward loading force to said cultivator shank, said loading spring subassembly including a compression spring which is compressible to permit upward pivotal movement of said cultivator shank when said cultivator tool carried by said shank encounters an obstacle such as a rock.

2. A spring trip cultivator shank assembly as defined in claim 1 in which said loading spring subassembly includes a headed guide rod extending through a clearance passage in said rearwardly extending portion of said bracket structure, a seat for said compression spring carried by the lower end of said guide rod, said compression spring being positioned about said guide rod between said seat and the under surface of said rearwardly extending portion of said bracket structure, an abutment on the lower end of said guide rod beneath said seat in thrust transmitting engagement with said abutment member whereby to transmit through said abutment member to said cultivator shank the downward loading force of said compression spring.

3. A spring trip cultivator shank assembly as defined in claim 2 wherein said seat includes U-shaped means supported from the lower end of said guide rod, said U-shaped means being adapted to straddle said abutment member and said cultivator shank whereby to maintain the lower end of said loading spring subassembly, said abutment member and said cultivator shank in proper alignment.

4. A spring trip cultivator shank assembly as defined in claim 1 including means pivotally connecting the front end of said abutment member to said side plates and wherein said abutment member holds said cultivator shank in pivotal engagement with said pivot means.

5. A spring trip cultivator shank assembly as defined in claim 1 in which the forward end of said cultivator shank is provided with a vertically downwardly extending portion lying contiguous the forward surface of said pivot means, whereby to prevent rearward movement of said shank relative to said pivot means and also whereby to laterally stabilize said forward end of said shank relative to said laterally spaced side plates.

6. A spring trip cultivator shank assembly adapted to be supported from the transverse tool bar of a cultivator apparatus, comprising a pair of downwardly extending side plates positioned contiguous the forward end of said assembly, said side plates being spaced laterally from each other but longitudinally of said tool bar, a cultivator shank adapted to support a cultivator tool contiguous the lower end thereof, the upper forward end of said cultivator shank extending between said side plates and including a curved part, horizontally extending pivot means carried by said side plates contiguous said curved part of said shank whereby the under surface of said curved part bears for pivotal movement against the peripheral surface of said pivot means to accomodate pivotal movement of said cultivator shank in a vertical plane, an abutment member received between said side plates and bearing against said cultivator shank to hold said cultivator shank against said pivot means, said abutment member extending beyond and rearwardly of said side plates in overlying relation to the upper surface of said cultivator shank, a bracket structure adapted to be supported by and to project rearwardly from said tool bar, a loading spring subassembly supported from a rearwardly extending portion of said bracket structure, the lower end of said loading spring subassembly bearing against a rearward portion of said abutment member whereby to transmit through said abutment member a downward loading force to said cultivator shank, said loading spring subassembly including a compression spring which is compressible to permit upward pivotal movement of said cultivator shank when said cultivator tool carried by said shank encounters an obstacle such as a rock.

7. A spring trip cultivator shank assembly as defined in claim 6 wherein said loading spring subassembly includes a U-shaped means with downwardly extending legs in straddling relation to said abutment member and to said cultivator shank.

8. A spring trip cultivator shank assembly as defined in claim 6 including means carried by said side plates and bearing against said abutment member in the region of said pivot means whereby to hold said abutment member against said cultivator shank in said region of said pivot means and whereby to hold said cultivator shank in pivotal bearing relation against said pivot means.

9. A spring trip cultivator shank assembly as defined in claim 6 in which the forward end of said cultivator shank is provided with a vertically downwardly extending portion lying contiguous the forward surface of said pivot means, whereby to prevent rearward movement of said shank relative to said pivot means, and also whereby to laterally stabilize said forward end of said shank relative to said laterally spaced side plates.

10. A spring trip cultivator shank assembly adapted to be supported from the transverse tool bar of a cultivator apparatus, comprising a pair of downwardly extending side plates positioned contiguous the forward end of said assembly, said side plates being spaced laterally from each other but longitudinally of said tool bar, a cultivator shank adapted to support a cultivator tool contiguous the lower end thereof, the forward end of said cultivator shank extending between said side plates and including a pivot part, horizontally extending pivot means carried by said side plates and pivotally engaging said pivot part of said shank to accomodate pivotal movement of said cultivator shank in a vertical plane, an abutment member disposed between and connected at its forward end to said side plates, said abutment member extending rearwardly of said side plates in overlying abutting relation to the upper surface of said cultivator shank, a bracket structure adapted to be supported by and to project rearwardly from said tool bar, a loading spring subassembly supported from a rearwardly extending portion of said bracket structure, the lower end of said loading spring subassembly bearing against a rearward portion of said abutment member whereby to transmit through said abutment member a downward loading force to said cultivator shank.

11. A spring trip cultivator shank assembly as defined in claim 10 wherein said loading spring subassembly includes a U-shaped means having legs in straddling relation to said abutment member and to said cultivator shank whereby to maintain the lower end of said loading spring subassembly, said abutment member and said cultivator shank in alignment.

12. A spring trip cultivator shank assembly as defined in claim 10 in which the forward end of said cultivator shank is provided with a vertically downwardly extending portion lying contiguous the forward surface of said pivot means, whereby to prevent rearward movement of said shank relative to said pivot means, and also whereby to laterally stabilize said forward end of said shank relative to said laterally spaced side plates.

* * * * *